United States Patent
Long et al.

(10) Patent No.: US 11,048,826 B2
(45) Date of Patent: Jun. 29, 2021

(54) FPGA DEVICE AND CLOUD SYSTEM BASED ON FPGA DEVICE

(71) Applicant: Alibaba Group Holding Limited, Grand Cayman (KY)

(72) Inventors: Xin Long, Hangzhou (CN); Jun Zhang, Hangzhou (CN); Yongke Zhao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/843,676

(22) Filed: Apr. 8, 2020

(65) Prior Publication Data

US 2020/0233982 A1 Jul. 23, 2020

Related U.S. Application Data

(63) Continuation of application No. PCT/CN2018/108514, filed on Sep. 29, 2018.

(30) Foreign Application Priority Data

Oct. 9, 2017 (CN) .......................... 201710929351.4

(51) Int. Cl.
*G06F 1/3215* (2019.01)
*G06F 8/654* (2018.01)
(Continued)

(52) U.S. Cl.
CPC ..... *G06F 21/76* (2013.01); *G01R 31/318533* (2013.01); *G06F 1/3215* (2013.01);
(Continued)

(58) Field of Classification Search
None
See application file for complete search history.

(56) References Cited

U.S. PATENT DOCUMENTS

| 8,824,492 B2 | 9/2014 | Wang et al. |
| 9,213,867 B2 | 12/2015 | Ramamurthy et al. |

(Continued)

FOREIGN PATENT DOCUMENTS

| CN | 103617054 A | 3/2014 |
| CN | 106549970 A | 3/2017 |

(Continued)

OTHER PUBLICATIONS

Translation of Search Report for corresponding PCT Application PCT/CN2018/108514, dated Apr. 18, 2019, a counterpart foreign application for U.S. Appl. No. 16/843,676 , 2 pages.

(Continued)

*Primary Examiner* — Anh Q Tran
(74) *Attorney, Agent, or Firm* — Lee & Hayes, P.C.

(57) ABSTRACT

A device including a management logic unit and a user logic unit, where the management logic unit comprises a Peripheral Component Interconnect Express (PCIe) module, and the PCIe module comprises a first physical functional unit and a second physical functional unit. The first physical functional unit is configured to receive a user logic loading request initiated by the second physical functional unit, where the user logic loading request carries a user logic identifier; obtain a user logic file based on the user logic identifier; and burn the user logic file into the user logic unit via a PCIe configuration channel. The present disclosure solves the technical problem that an existing FPGA cannot be deployed in the cloud due to the need for connecting to a JTAG cable when being remotely configured or debugged.

20 Claims, 6 Drawing Sheets

(51) Int. Cl.
*G06F 9/30* (2018.01)
*G06F 9/38* (2018.01)
*G06F 11/14* (2006.01)
*G06F 13/42* (2006.01)
*G06F 21/73* (2013.01)
*G06F 21/76* (2013.01)
*G06F 30/343* (2020.01)
*G01R 31/3185* (2006.01)

(52) U.S. Cl.
CPC .......... *G06F 8/654* (2018.02); *G06F 9/30098* (2013.01); *G06F 9/3861* (2013.01); *G06F 11/1441* (2013.01); *G06F 13/4282* (2013.01); *G06F 30/343* (2020.01); *G06F 2213/0026* (2013.01); *G06F 2221/2141* (2013.01)

(56) References Cited

U.S. PATENT DOCUMENTS

| | | | |
|---|---|---|---|
| 9,455,955 | B2 | 9/2016 | Fetik |
| 10,120,704 | B2 | 11/2018 | Ebcioglu et al. |
| 10,203,967 | B1* | 2/2019 | Atta ................. G06F 13/4282 |
| 2014/0237292 | A1 | 8/2014 | Chan |
| 2015/0178243 | A1 | 6/2015 | Lowery et al. |
| 2015/0254088 | A1 | 9/2015 | Chou et al. |
| 2016/0210167 | A1 | 7/2016 | Bolic et al. |
| 2016/0321081 | A1 | 11/2016 | Kim et al. |
| 2017/0250802 | A1* | 8/2017 | Shimizu ................. H04L 9/0816 |
| 2019/0087606 | A1* | 3/2019 | Subhaschandra ....... G06F 21/31 |

FOREIGN PATENT DOCUMENTS

| | | |
|---|---|---|
| CN | 106951388 A | 7/2017 |
| CN | 107038040 A | 8/2017 |

OTHER PUBLICATIONS

Translation of Writeen Opinion for corresponding PCT Application PCT/CN2018/108514, dated Apr. 9, 2019, a counterpart foreign application for U.S. Appl. No. 16/843,676, 3 pages.

* cited by examiner

FPGA DEVICE AND CLOUD SYSTEM BASED ON FPGA DEVICE

CROSS REFERENCE TO RELATED PATENT APPLICATIONS

This application claims priority to and is a continuation of PCT Patent Application No. PCT/CN2018/108514, filed on 29 Sep. 2018 and entitled "FPGA DEVICE AND CLOUD SYSTEM BASED ON FPGA DEVICE," which claims priority to Chinese Patent Application No. 201710929351.4, filed on 9 Oct. 2017 and entitled "FPGA DEVICE AND CLOUD SYSTEM BASED ON FPGA DEVICE," which are incorporated herein by reference in their entirety.

TECHNICAL FIELD

The present disclosure relates to the field of cloud computing, and, more particularly, to an FPGA device and a cloud system based on the FPGA device.

BACKGROUND

With the rapid growth of Internet scale and data volume, cloud computing has become indispensable. From the perspective of power consumption and computing capabilities, traditional cloud computing hardware based on CPU now struggles to meet today's growing computing needs. GPU and FPGA are ideal choices for computing capability acceleration. Compared with GPU's advantages in computing capabilities, FPGA is more flexible, with lower power consumption and higher computing performance. For example, with accelerators (such as SIMD and MIMD) that develop customized algorithms, FPGA has already become a promising hardware for accelerating cloud computing.

However, because the existing FPGA needs to connect a JTAG (Joint Test Action Group) cable for remote configuration or debugging, it is not suitable for cloud deployment.

Regarding the foregoing problem of low computing performance due to the existing FPGA failing to achieve the security isolation of physical functions, no effective solution has been proposed at present.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Example embodiments of the present disclosure provide an FPGA device and a cloud system based on the FPGA device, for at least resolving the technical problem that an existing FPGA cannot be deployed in the cloud due to the need for connecting to a JTAG cable when being remotely configured or debugged.

According to one aspect of the example embodiments of the present disclosure, an FPGA device is provided, comprising: a management logic unit and a user logic unit, where the management logic unit comprises a Peripheral Component Interconnect Express (PCIe) module, and the PCIe module comprises a first physical functional unit and a second physical functional unit. The first physical functional unit is configured to receive a user logic loading request initiated by the second physical functional unit, where the user logic loading request carries a user logic identifier; obtain a user logic file based on the user logic identifier; and burn the user logic file into the user logic unit via a PCIe configuration channel.

According to another aspect of the example embodiments of the present disclosure, a cloud system based on an FPGA device is further provided, comprising: a host; and an FPGA device with any of the features mentioned above.

In the example embodiments of the present disclosure, the PCIe module is configured in the management logic unit of the FPGA device, and the PCIe module is divided into physical functional units with different permissions, and the management logic unit and the user logic unit are administered through configuration. The management logic unit comprises a PCIe module, and the PCIe module comprises a first physical functional unit and a second physical functional unit. The first physical functional unit is configured to receive a user logic loading request initiated by the second physical functional unit, where the user logic loading request carries a user logic identifier; obtain a user logic file based on the user logic identifier; and burn the user logic file into the user logic unit via a PCIe configuration channel. As such, remote configuration is achieved without connecting to a JTAG cable when in communication with the host, so as to achieve the technical effects of improving the performance of the FPGA, thereby resolving the technical problem that an existing FPGA cannot be deployed in the cloud due to the need for connecting to a JTAG cable when being remotely configured or debugged.

BRIEF DESCRIPTION OF DRAWINGS

The drawings described herein are used to enable a further understanding of the present disclosure and constitute a part thereof. The example embodiments of the present disclosure and the descriptions thereof are used to explain the present disclosure, and do not constitute an improper limitation on the present disclosure. In the drawings.

DESCRIPTION OF EXAMPLE EMBODIMENTS

In order to enable those skilled in the art to better understand the solutions of the present disclosure, the technical solutions in the example embodiments of the present disclosure will be described clearly and completely below in combination with the drawings in the example embodiments of the present disclosure. Apparently, the described example embodiments only represent some of the example embodiments of the present disclosure, but not all the example embodiments. All other example embodiments obtained by a person of ordinary skill in the art based on the example embodiments of the present disclosure without involving an inventive effort fall within the protection scope of the present disclosure.

It should be noted that the terms "first" and "second" in the description and claims of the present disclosure and the above drawings are used to distinguish similar objects, and are not necessarily intended to describe a specific order or sequence. It should be understood that data used in this way is interchangeable where appropriate, so that the example embodiments of the present disclosure described herein can be implemented in an order other than those illustrated or described herein. In addition, the terms "comprising" and "having" and any variations thereof are intended to cover non-exclusive inclusions. For example, a process, method, system, product, or device that contains a series of steps or units is not necessarily limited to the steps or units explicitly listed, and may instead include other steps or units not explicitly listed or inherent to these processes, methods, products, or devices.

Some of the nouns or terms that appear in the description of the example embodiments of the present disclosure are as follows:

(1) Field Programmable Gate Array (FPGA)
(2) Application Specific Integrated Circuit (ASIC)
(3) Peripheral Component Interconnect Express (PCIe)
(4) Joint Test Action Group (JTAG), which is mainly used in boundary scan tests of circuits and on-line system programming of programmable chips
(5) Direct Memory Access (DMA)

According to an example embodiment of the present disclosure, an example embodiment of an FPGA device is further provided. It should be noted that before further describing the details of each example embodiment of the present disclosure, a suitable FPGA device that can be used to implement the principle of this application will be described with reference to FIG. 1.

Figure 1:
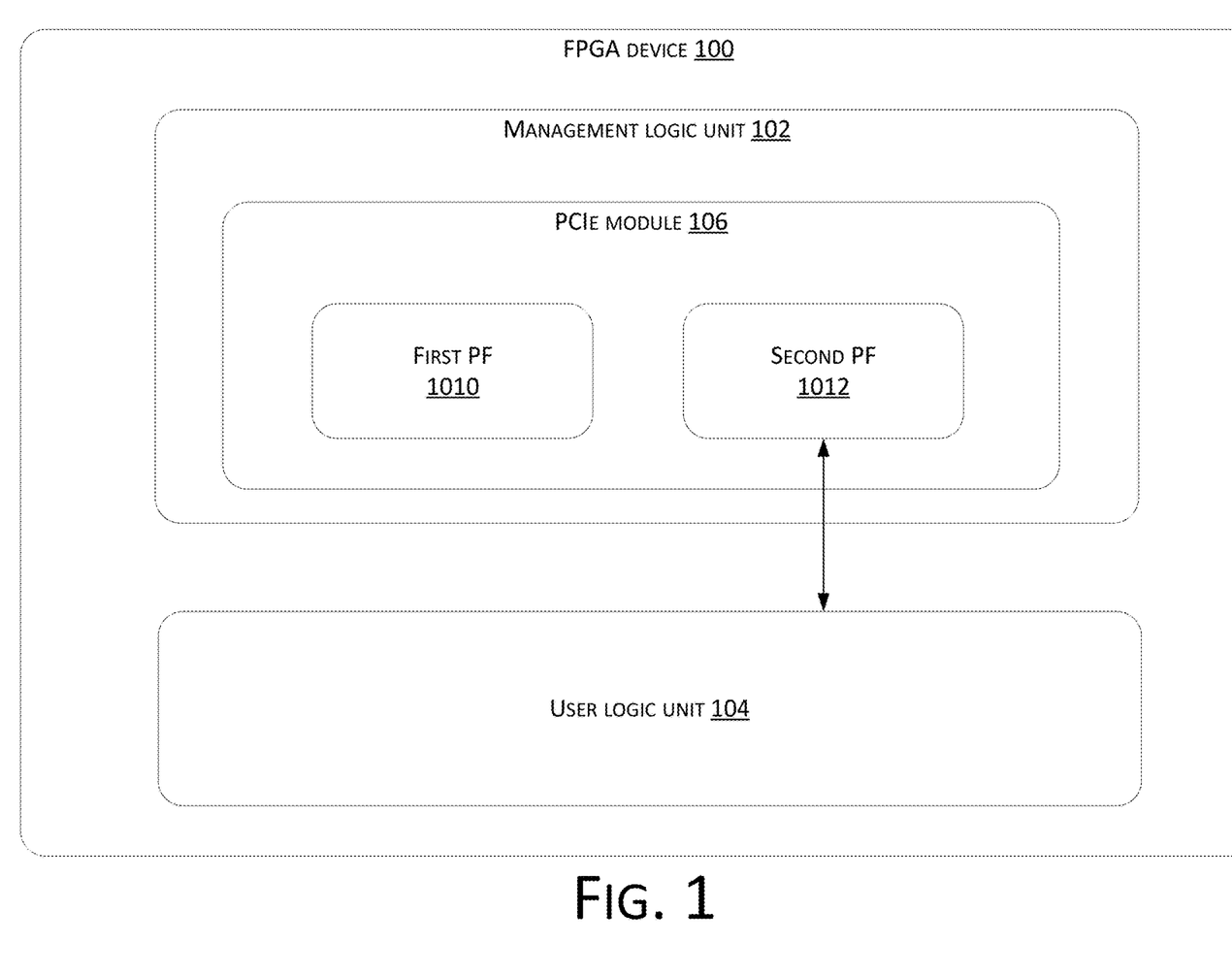
FIG. 1 is a schematic structural diagram of an FPGA device according to an example embodiment of the present disclosure.

FIG. 1 is a schematic structural diagram of an FPGA device according to an example embodiment of the present disclosure. For description purpose, the structure drawn is only an example of a suitable environment, and does not impose any limitation to the scope of use or function of the present disclosure. Nor should this FPGA device be interpreted as being dependent on or requiring for any of the components or combinations shown in FIG. 1.

As a semi-customized circuit in the field of ASIC, FPGA not only solves the shortcomings of customized circuits, but also overcomes the limitations of gate circuit book of the original programmable devices.

Moreover, FPGA can be widely used in national defense fields such as aerospace, aviation, electronics, communication, and radar. It can also be used in medical equipment, including ultrasonic detector and CT scanning instrument, as well as in fields of consumer electronics, automotive electronics, robots and data mining. Additionally, with the rise of robot, UAV, big data, Internet of Things, unmanned driving and 5G communication, the market prospect of FPGA will be increasingly broad while maintaining steady growth.

For the market demand and the rapid development of FPGA, it is urgent to solve the problem that the existing FPGA cannot be deployed in the cloud.

It should be noted that in addition to implementing the basic data transmission function, the FPGA device provided in the example embodiments of the present disclosure can also realize auxiliary functions, such as, remote debugging, remote upgrade, exception handling and hardware monitoring. This conforms to the use environment of the FPGA in cloud, and can thus provide reliable, stable, easy-to-use and safe FPGA acceleration cloud service.

For example, FIG. 1 shows the schematic diagram of an FPGA device. As shown in FIG. 1, an FPGA device 100 comprises: a management logic unit 102 and a user logic unit 104.

The management logic unit 102 comprises a PCIe module 106, and the PCIe module 106 comprises a first PF (Physical Functional unit) 1010 and a second PF 1012. The first PF 1010 is configured to receive a user logic loading request initiated by the second PF 1012, where the user logic loading request carries a user logic identifier; obtain a user logic file based on the user logic identifier; and burn the user logic file into the user logic unit via a PCIe configuration channel.

With the PCIe module configured, the FPGA device 100 provided in this application is suitable for setting up the FPGA cloud server architecture deployed in the cloud, thus realizing the functions of remote debugging, remote upgrading, exception handling and hardware monitoring.

For example, the hardware logic on the FPGA device can be divided into two parts: the management logic unit and the user logic unit.

It should be noted that the management logic unit can be provided by the FPGA server (for example, cloud server), while the user logic unit can be provided by an end user and a third-party IP manufacturer.

As an example embodiment, the management logic unit can be used for peripheral communication, and the user logic unit can be used to implement the hotspot module of user application programs. For example, for compression/decompression application, the user logic can realize the actual compression/decompression algorithm (such as the gizp algorithm). Data to be compressed is sent to the FPGA device from a host CPU through PCIe, and the compressed data then returns to the host CPU from a PCIe interface.

In the above example embodiment, peripheral communication can be, but is not limited to, any of the following forms of communication: communication with the host CPU through PCIe, communication with other network devices through Ethernet or optical fiber interfaces, and communication with external storage devices through DDR (Double Data Rate) controller interfaces/Flash interfaces.

In additional, it should still be noted that, different from the fixed hardware logic of an ASIC chip, the above-mentioned user logic unit can be replaced based on requirements. This means that dynamic reconfiguration can be performed by the management logic unit. For example, the dynamic reconfiguration can be implemented by using the Partial Reconfiguration (PR) function in FPGA.

As an example embodiment, the management logic unit on the FPGA device can communicate with the host CPU via the PCIe module, and the PCIe module can be comprised of two or more PFs with different permissions.

In a method possible for implementation, the PCIe module may be comprised of, without limitation to, a first PF and a second PF (i.e., the permission segmentation mode of the dual PFs).

Figure 3:
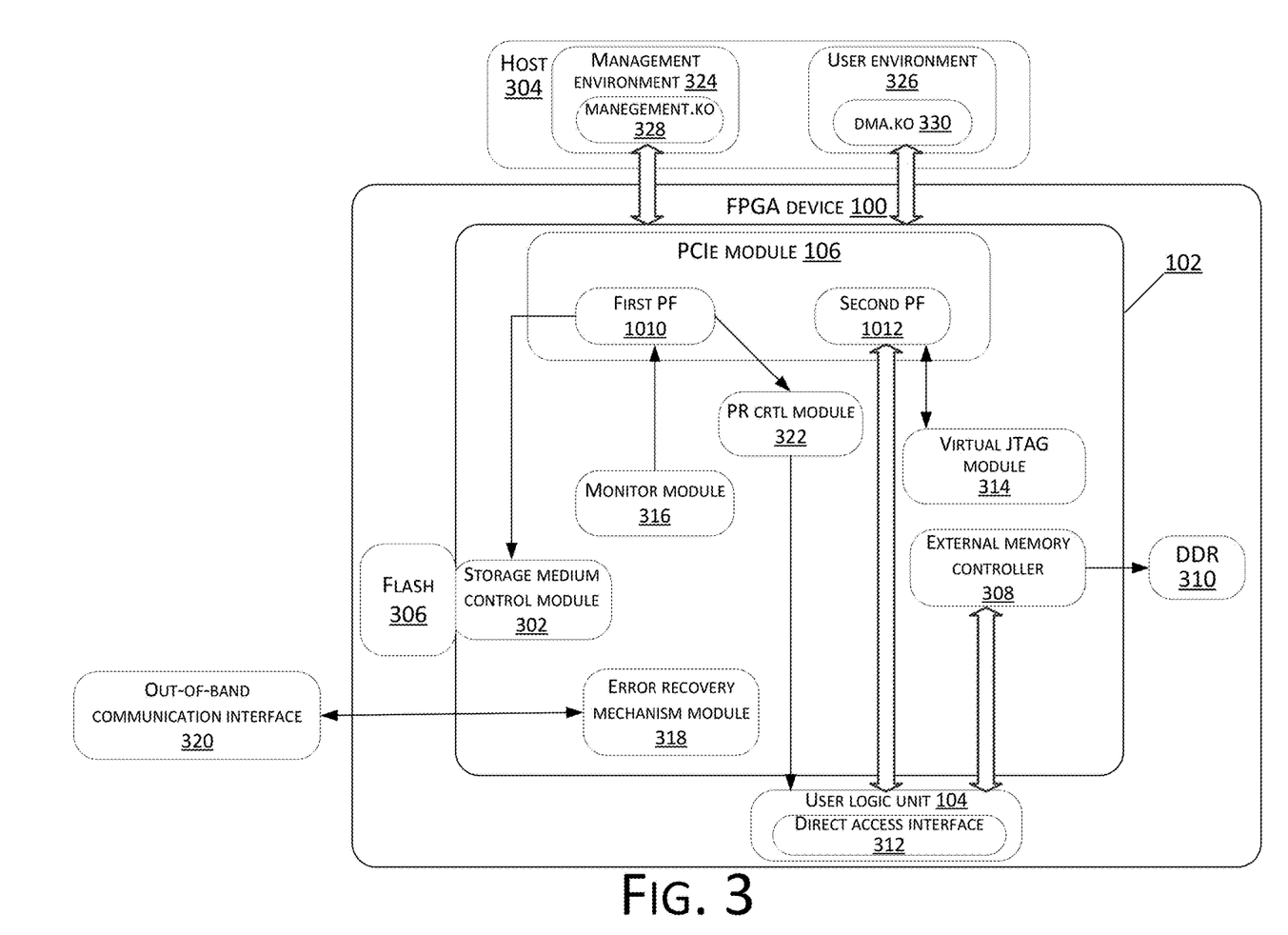
FIG. 3 is a schematic structural diagram of an example FPGA device according to an example embodiment of the present disclosure.

It should be noted that, as shown in FIG. 3, because the host CPU is composed of an isolated management environment and user environment, and the management environment and user environment are isolated from each other through a virtualization technology, the above isolation method can be either two virtual machines or a virtual machine and the host. In the user logic control process, the first PF can call management.ko in the management environment of the host and the second PF can call dma.ko in the user environment of the host.

As an example embodiment, the first PF communicates with the management environment in the host CPU, and the second PF communicates with the user environment in the host CPU. To implement high-speed and secure communication with the host CPU, the first PF and the second PF can also be separate physically, and there are different configuration spaces and other permission segmentation methods between them.

It should also be noted that the PCIe module of the FPGA device is divided into PFs with different permissions, and the host is divided into a management environment and a user environment associated with them to realize security isolation. Ordinary users can only use the user environment to access the user logic and conduct remote debugging for the user logic. Super administrator users can use the management environment to conduct operations with higher permission, such as management, monitoring, and reconfiguration, etc. to a board card.

In addition, it also needs to be noted that in the example embodiments provided in this present disclosure, the problem of user inaccessibility and even NC downtime can be avoided with the security isolation of the first PF and the second PF, further improving the computing performance of the FPGA device.

Figure 2:
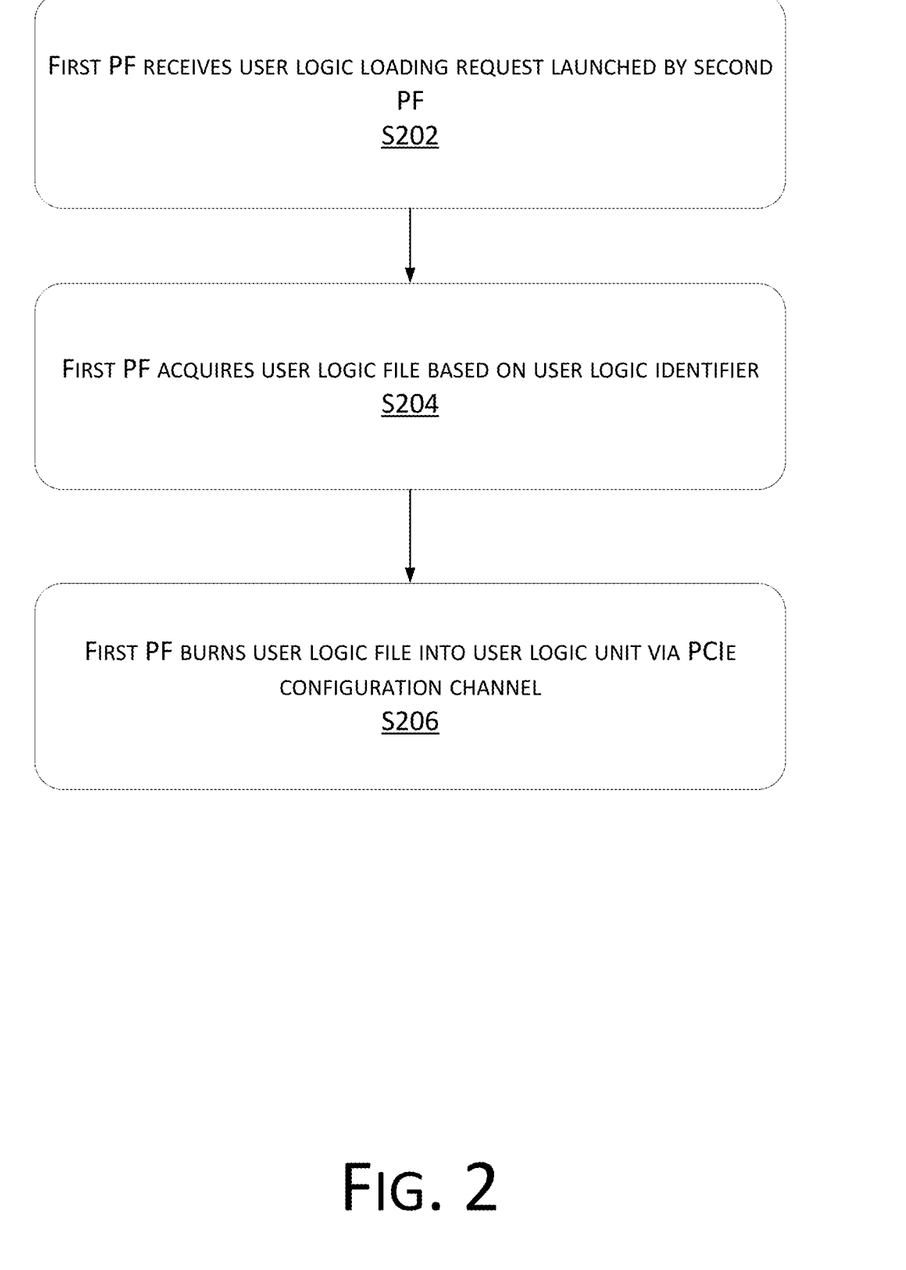
FIG. 2 is a schematic flowchart of dynamic reconfiguration of an FPGA device according to an example embodiment of the present disclosure.

Take the above dual PF permission segmentation method as an example, as shown in FIG. 2, the first PF can implement dynamic reconfiguration through, but not limited to, the following ways:

Step S202, the first PF receives a user logic loading request initiated by the second PF.

For example, the user logic loading request carries a user logic identifier.

As an example embodiment, the second PF can send a user logic loading request to the server based on its own identity.

Step S204, the first PF obtains a user logic file based on the user logic identifier.

For example, in step S204, the first PF can obtain the user logic file from a remote storage side based on the above user logic identifier after the server loads the authentication request and responds.

Step S206, the first PF burns the user logic file into the user logic unit via a PCIe configuration channel.

As an example embodiment, after the user logic file is obtained, the first PF can burn the user logic file into the user logic unit via the partial reconfiguration control (PR ctrl) module in the PCIe configuration channel, and load a corresponding mirror image based on the user logic loading request.

Based on steps S202 to S206 mentioned above, the FPGA device provided in the present disclosure can complete the dynamic reconfiguration.

In additional, in the example embodiments provided in the present disclosure, the first PF can also be configured to implement dynamic reconfiguration, remote upgrade Flash, exception handling, and hardware monitoring. The second PF can also be configured to conduct high-speed data exchange with the user logic unit via DMA and realize the remote debugging function of the user logic unit.

The solution defined in the above example embodiment demonstrates that the FPGA device provided in the present disclosure comprises a management logic unit and a user logic unit, where the management logic unit comprises a PCIe module, and the PCIe module comprises a first physical device PF and a second PF. The first PF is configured to receive a user logic loading request initiated by the second PF, where the user logic loading request carries a user logic identifier; obtain a user logic file based on the user logic identifier; and burn the user logic file into the user logic unit via a PCIe configuration channel.

It is easy to note that because the host CPU is composed of isolated management environment and user environment, the hardware logic of the FPGA device in this application can be divided into a management logic unit and a user logic unit. The management logic unit communicates with the host CPU via the PCIe module. In the process of implementing dynamic reconfiguration, the FPGA device in the example embodiment of the present disclosure can realize dynamic reconfiguration by security isolation via permission segmentation of two or more PFs in the PCIe module.

In addition, in the example embodiment of the present disclosure, the first PF can also be configured to implement dynamic reconfiguration, remote upgrade Flash, exception handling, and hardware monitoring. The second PF can also be configured to conduct high-speed data exchange with the user logic unit via DMA and implement the remote debugging function of the user logic unit.

Through the solution provided by the example embodiments of the present disclosure, the PCIe module is configured in the management logic unit of the FPGA device, and the PCIe module is divided into PFs with different permissions to achieve remote configuration without connecting to a JTAG cable when in communication with the host. This realizes the technical effect of improving the performance of FPGA, and further solves the technical problem that an existing FPGA cannot be deployed in the cloud due to the need for connecting to a JTAG cable when being remotely configured or debugged.

As an example embodiment, FIG. 3 is a schematic structural diagram of the example FPGA device 100 according to an example embodiment of the present disclosure. As shown in FIG. 3, the management logic unit 102 further comprises a storage medium control module 302. The first PF 1010 is further configured to receive an upgrade request sent by a server; and obtain an upgrade file from a host 304 via a PCIe interface based on the upgrade request. The storage medium control module 302 is connected with the first PF 1010 to upgrade a storage medium based on the upgrade file.

It should be noted that the implementation mode of remote upgrade storage media is similar to that of the above-mentioned dynamic reconfiguration of the present disclosure. The difference is that the upgrade request submitted by a cloud management and control system (server) is sent to an external storage side, and a command is sent to the first PF 1010.

As shown in FIG. 3, the storage medium control module 302 is connected with a Flash 306 (storage medium), and the first PF 1010 is connected with the storage medium control module 302. In an example embodiment, the first PF 1010 obtains the upgrade file from the host 304 via the PCIe interface based on the upgrade request, and reads as well as writes the register via PCIe. The storage medium control (Flash ctrl) module 302 in the management logic unit 102 is configured to upgrade Flash firmware on a board card.

It should be noted that a super administrator is responsible for the Flash upgrade process, and ordinary users do not have the permission to upgrade and update.

As an example embodiment, as shown in FIG. 3, the management logic unit 102 also comprises an external memory controller 308, i.e. DDR Ctrl, which is connected with an external memory DDR 310 for reading and writing the external memory DDR 310.

As an example embodiment, the FPGA device also comprises a shared register. The second PF is further configured to report exception information via the shared register. The first PF is further configured to obtain the exception information from the shared register and perform an operation corresponding to the exception information.

As an example embodiment, an exception handling mechanism for the FPGA device can be implemented via internal shared registers.

Figure 4:
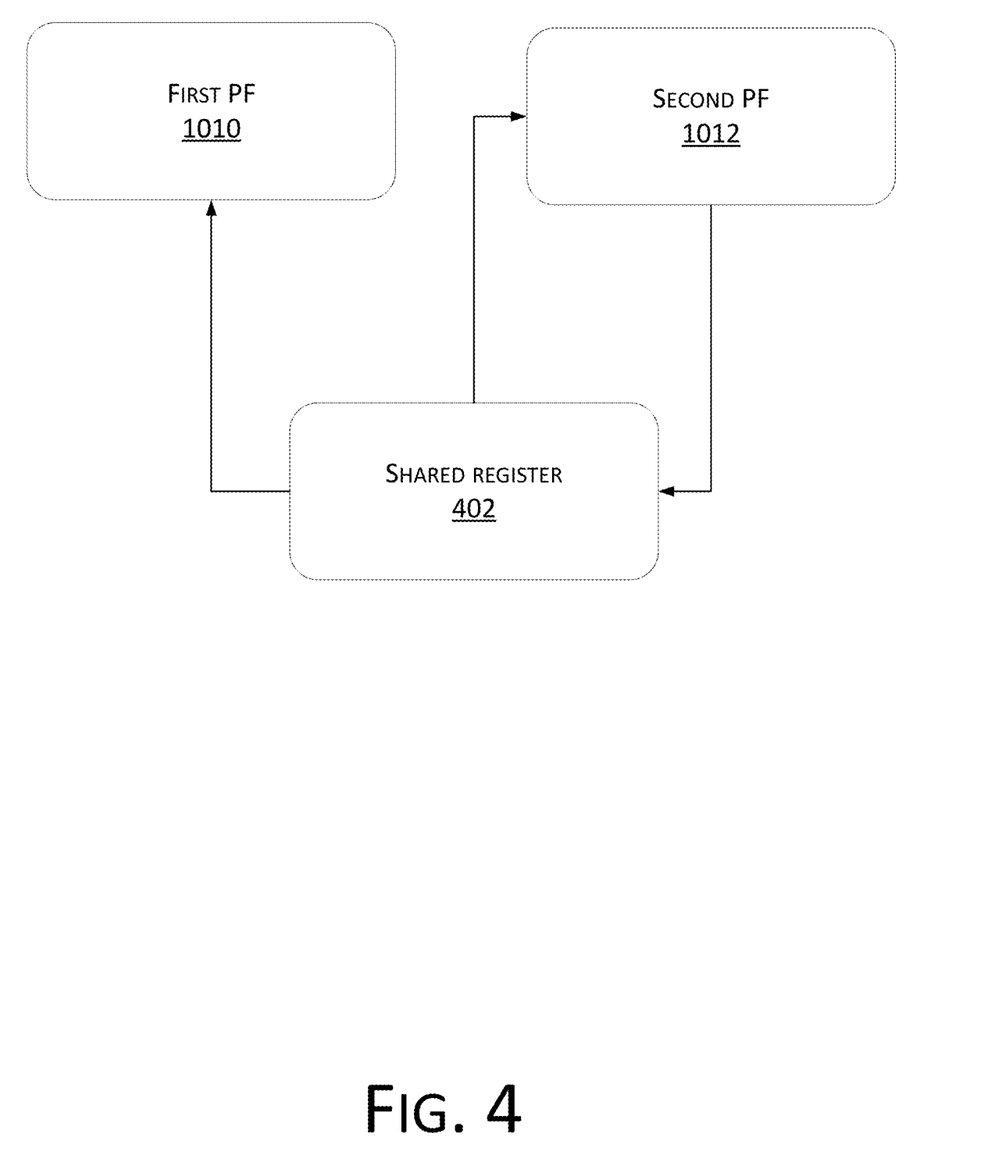
FIG. 4 is a schematic structural diagram of the connection between the shared register and PF in an example FPGA device according to an example embodiment of the present disclosure.

FIG. 4 is a schematic structural diagram of a connection between the shared register 402 and PF in an example FPGA device according to an example embodiment of the present disclosure. As shown in FIG. 4, the shared register is connected with the first PF 1010 and the second PF 1012. The second PF 1012 can read and write the shared register 402 as well as report the internal exception information via the shared register, and the first PF 1010 can read the shared register 402 and poll the shared register to obtain the exception information reported by the shared register 402.

In an example embodiment, as shown in FIG. 3, the user logic unit comprises a direct access interface 312. The second PF 1012 is further configured to exchange data with the user logic unit 104 via the direct access interface 312.

For example, a DMA interface can be the direct access interface 312. Within the FPGA device, the DMA interface used to provide user logic belongs to the standard protocol interface, so as to guarantee the DMA interface access of the second PF exclusive PCIe.

As an example embodiment, the user logic unit adopts the read interface in the direct access interface to move data from the host 304 to DMA. The user logic unit 104 adopts the write interface in the direct access interface 312 to move the FPGA data to the host 304, thereby realizing data exchange between the host 304 and FPGA device 100.

It should be noted that the DMA interface of FPGA logic provided to the second PF 1012 can abstract the hardware interface, thereby achieving the purpose of security isolation and simplified programming.

As an example embodiment, as shown in FIG. 3, the management logic unit 102 also comprises a virtual JTAG module 314. The second PF 1012 is configured to obtain debugging data of the user logic unit 104, and the virtual JTAG module 314 is connected with the second PF 1012 and configured to debug the debugging data via the PCIe interface.

For example, the virtual JTAG module can be configured to realize a remote debugging function of the user logic unit.

It should be noted that the virtual JTAG module 314 simulates the JTAG timing sequence when debugging the user logic unit 104 remotely. It can obtain the hardware waveform and send the corresponding data to the remote end or local debugging software via the PCIe bus interface without the physical hard wire of JTAG, giving it high flexibility.

As an example embodiment, as shown in FIG. 3, the management logic unit 102 also comprises a monitoring module 316, which is connected with the first PF 1010 and configured to detect the temperature and power consumption of the hardware, and transmit the detected temperature and power consumption to the first PF 1010.

For example, the above monitoring module 316 is also the Monitor module.

As an example embodiment, the management logic unit 102 can obtain a hardware information status internally monitored by the FPGA via a register access mechanism. For example, the hardware information status can be detected by the monitor module, and the detected temperature and power consumption can be transmitted to the first PF.

It should be noted that the monitor module can be used for hardware monitoring and has the function of temperature and power sensor detection.

As an example embodiment, as shown in FIG. 3, the management logic unit 102 also comprises an error recovery mechanism module 318, which is connected with an out-of-band communication interface 320, and is configured to reset the user logic unit in case of an exception.

For example, the error recovery mechanism module 318 is the Error Recovery module, and the out-of-band communication interface, namely the SMBus, is configured on a main board.

As an example embodiment, the management logic unit 102 also comprises a partial reconfiguration control (PR ctrl) module 322, configured to partially reconfigure the user logic unit. When the user needs to change the user logic, the user can send a corresponding request to a corresponding configuration space register in the first PF.

To avoid accidents such as IP disclosure caused by the user's random configuration and access to user logic file, in an example embodiment, the first PF 1010 is further configured to verify a bitstream of the user logic file; and in the case of successful verification, trigger the burning of the user logic file into the user logic unit 104 via the PCIe configuration channel.

As an example embodiment, the user logic loading request also carries a dynamic verification identifier. The first PF 1010 is further configured to perform permission verification based on the dynamic verification identifier and a preset verification identifier received from the server; and in the case of successful verification, trigger the obtaining of the user logic file based on the user logic identifier.

It should be noted that users can get verified and obtain the user logic file to implement dynamic reconfiguration only by meeting three conditions, including dynamic verification identifier (updated every minute), FPGA cloud server permission, and user logic ID. In dynamic reconfiguration, the management logic unit performs the final verification against the bitstream, that is, verify that the bitstream matches the expected user logic file.

For example, the host 304 includes a management environment 324 and a user environment 326. The management environment 324 includes a configuration file such as management.ko 328 for reconfiguration. The user environment 326 includes a DMA management file such as dma.ko 330 for burning files. The first PF 1010 can call Manegement.ko 326 in the management environment 322 of the host 304 and the second PF 1012 can call dma.ko 328 in the user environment 324 of the host 304.

Figure 5:
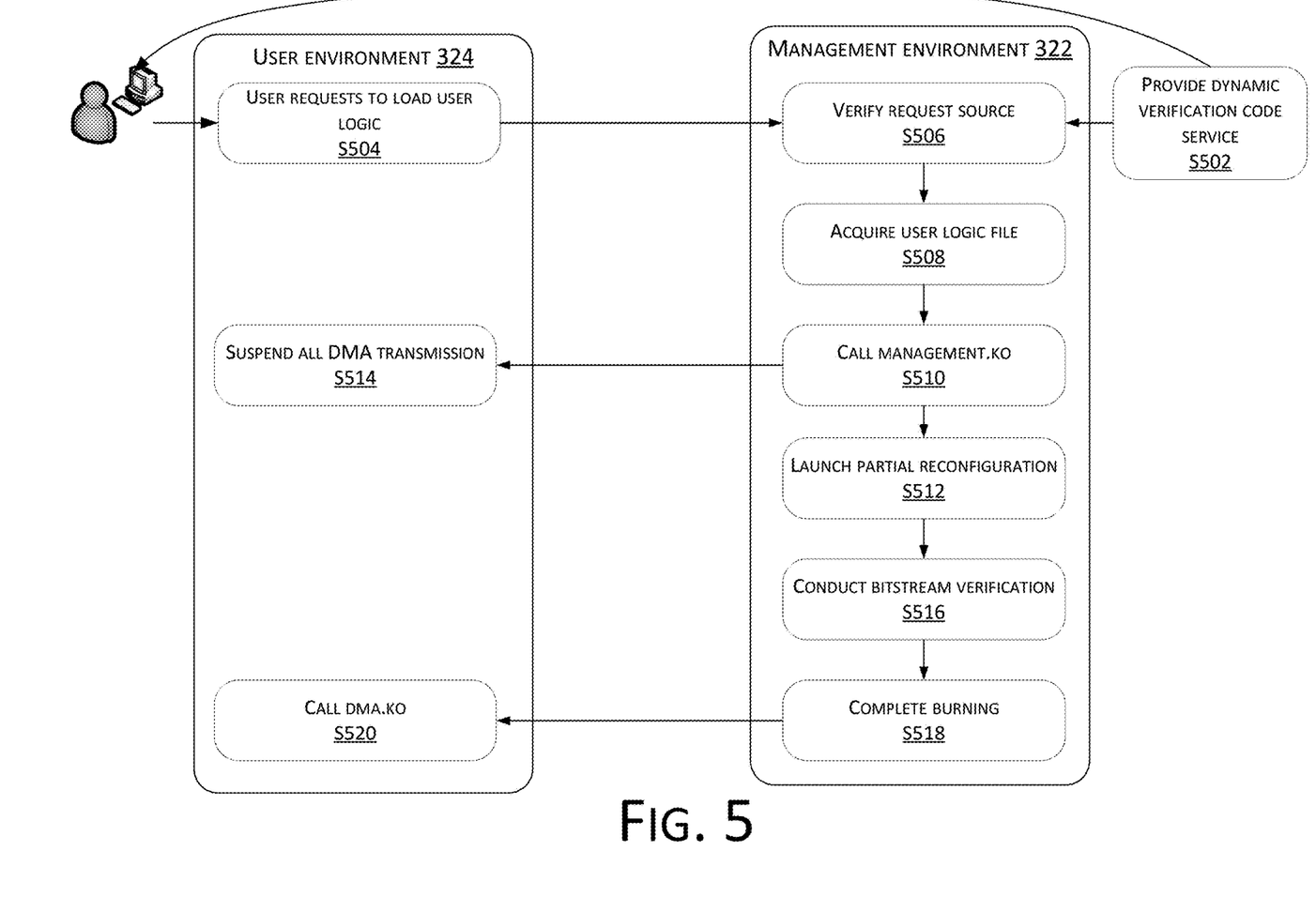
FIG. 5 is a schematic flowchart of example user logic loading according to an example embodiment of the present disclosure.

For understanding of the above example embodiments of the present disclosure, the present disclosure provides a schematic flowchart of example user logic loading as shown in FIG. 5 to further explain the user logic loading flow:

Step S502, a host provides a dynamic verification code service.

To protect the security of the user logic file, as an example embodiment, when burning the user logic file in the management environment, the host CPU can provide the dynamic verification code service to verify the user logic loading request.

Step S504, the user requests to load the user logic.

For example, the user logic loading request carries the identification information of user_logic_id and instance_id.

As an example embodiment, the user launches a user logic loading request to the user environment via the second PF, and the user logic loading request carries the user logic identifier.

Step S506, the super administrator verifies the source of the request.

As an example embodiment, the super administrator in the management environment can verify the user logic loading request, including but not limited to the verification of dynamic verification code, FPGA cloud server permission and user logic ID. In case of successful verification, step S508 will be executed.

Step S508, the user logic file is obtained.

For example, when the super administrator approves the dynamic verification code, FPGA cloud server permission and the user logic ID, the user logic file will be obtained based on the user logic identifier.

Step S510, management.ko in the host is called.

For example, the first PF calls management.ko in the host management environment.

Step S512, a partial reconfiguration is initiated.

As an example embodiment, the first PF initiates a dynamic reconfiguration by calling management.ko in the management environment.

Step S514, all DMA transmission is suspended.

As an example embodiment, DMA data exchange and remote debugging function of the user logic unit are suspended during dynamic reconfiguration.

Step S516, bitstream verification is performed.

As an example embodiment, the first PF is configured to verify the bitstream of the user logic file; and in case of successful verification, trigger the burning of the user logic file via the PCIe configuration channel.

Step S518, burning is completed.

As an example embodiment, the user logic file can be burned into the user logic unit via the PCIe configuration channel.

Step S520, dma.ko is called.

As an example embodiment, the second PF calls dma.ko in the user environment to burn the user logic file into the user logic unit.

Figure 6:
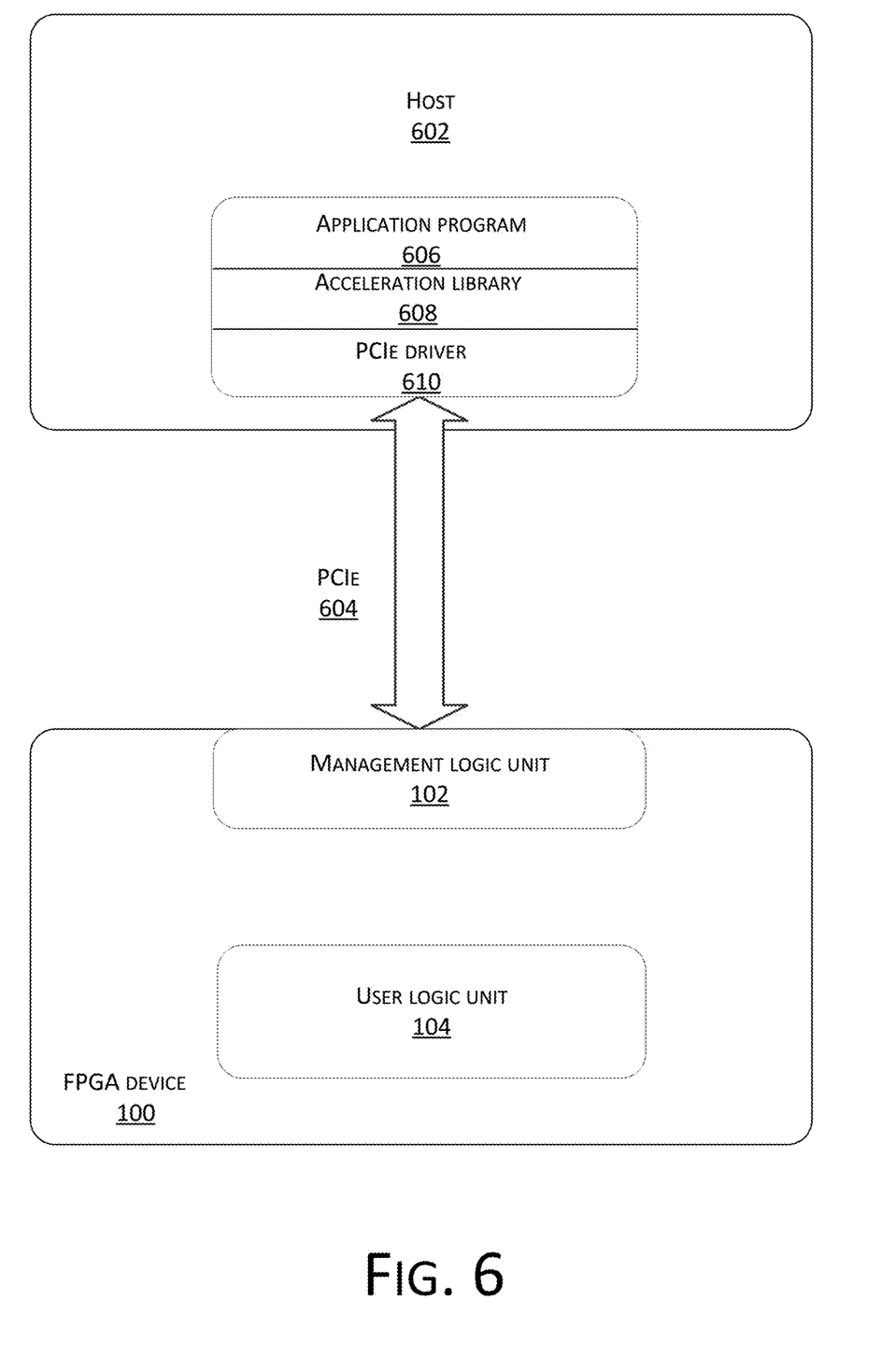
FIG. 6 is a structural diagram of a cloud system based on an FPGA device according to an example embodiment of the present disclosure.

According to the example embodiment of the present disclosure, a cloud system based on an FPGA device is also provided, as shown in FIG. 6, comprising an FPGA device 100 and a host 602, such as a CPU.

The FPGA device 100 comprises a management logic unit 102 and a user logic unit 104, where the management logic unit 102 comprises a Peripheral Component Interconnect Express (PCIe) module, and the PCIe module comprises a first physical device PF and a second PF. The first PF is configured to receive a user logic loading request initiated by the second PF, where the user logic loading request carries a user logic identifier; obtain a user logic file based on the user logic identifier; and burn the user logic file into the user logic unit via a PCIe configuration channel.

It should be noted that, as shown in FIG. 6, the management logic unit 102 in the FPGA device 100 and the host 602 communicate via the PCIe 604, the host 602 is responsible for the software part of the user application program, and the FPGA device 100 is responsible for the hardware acceleration of the hotspot module. Among them, the host 602 comprises the application program 606, the acceleration library 608, and the PCIe driver 610.

To protect the security of the user logic file, when the host CPU burns the user logic file in the management environment, it can conduct verification via the identity verification process in the above example embodiment.

The solution defined in the above example embodiments demonstrates that the cloud system based on an FPGA device provided in this application comprises a host, and any example FPGA device described above. The FPGA device comprises a management logic unit and a user logic unit, the management logic unit comprises a PCIe module, and the PCIe module comprises a first physical device PF and a second PF. The first PF is configured to receive a user logic loading request initiated by the second PF, where the user logic loading request carries a user logic identifier; obtain a user logic file based on the user logic identifier; and burn the user logic file into the user logic unit via a PCIe configuration channel.

It is easy to note that since the host CPU is composed of an isolated management environment and a user environment, the hardware logic of the FPGA device in this application can be divided into a management logic unit and a user logic unit. The management logic unit communicates with the host CPU via a PCIe module. In the process of implementing dynamic reconfiguration, the FPGA device in the present disclosure example embodiment can realize dynamic reconfiguration by security isolation via the permission segmentation of two or more PFs in the PCIe module.

In addition, in the example embodiment of the present disclosure, the first PF can also be configured to implement dynamic reconfiguration, remote upgrade Flash, exception handling, and hardware monitoring, The second PF can also be configured to conduct high-speed data exchange with the user logic unit via DMA and implement the remote debugging function of the user logic unit.

Through the solution provided by the above example embodiments of the present disclosure, the PCIe module is disposed in the management logic unit of the FPGA device, and the PCIe module is divided into PFs with different permissions to achieve remote configuration without connecting to a JTAG cable when in communication with the host. This realizes the technical effect of improving the performance of FPGA, and further solves the technical problem that an existing FPGA cannot be deployed in the cloud due to the need for connecting to a JTAG cable when being remotely configured or debugged.

To implement the data exchange between the host CPU and FPGA device, a PCIe driver module is needed to provide support. In an example embodiment, as shown in FIG. 6, the host comprises a PCIe driver 3 for data exchange with the PCIe module in the FPGA device.

It should be noted that the present disclosure does not limit the version of the above PCIe, and the versions can be, but not limited to: 1.0, 2.0, 3.0 and 4.0. The host and FPGA device in FIG. 6 only schematically draw a correspondence in 1:1. In the actual application process, the example embodiments of the present disclosure can support correspondence in 1:N (where N is the number of FPGA devices).

In addition, to facilitate the programming of user applications, an acceleration library for users to call is also provided on the PCIe driver. Users can realize transparent acceleration when using the acceleration library and they do not need to know the details of hardware.

In another example embodiment, the host comprises a management environment and a user environment; the management environment is used to access the management logic unit in the FPGA device via the first PF of the FPGA device in response to the operation of the user; the user environment is used to access the user logic unit in the FPGA device via the second PF of the FPGA device in response to the operation of the user.

It should be noted that for the foregoing method example embodiments, for the sake of a concise description, the method example embodiments are all described as a combination of a series of actions. However, those skilled in the art should know that the present disclosure is not limited thereto. According to the present disclosure, some steps may be executed in another order or simultaneously. In addition, those skilled in the art should also know that the example embodiments described in the description are all preferred example embodiments, and the actions and modules involved are not necessarily required by the present disclosure.

Based on the description of the foregoing example embodiments, those skilled in the art can clearly understand that the methods of the foregoing example embodiments can be implemented using software and a needed universal hardware platform, and can certainly be implemented also by using hardware; in many cases, the former is a better implementation however. Based on such an understanding, the part of the technical solution of the present disclosure, which is essential or contributes to the prior art, can be embodied in the form of a software product. The computer software product is stored in a storage medium (such as a ROM/RAM, a magnetic disk, and an optical disk) and includes several instructions for enabling a terminal device (which may be a mobile phone, a computer, a server, a network device, or the like) to execute the method of each example embodiment of the present disclosure.

The serial numbers of the example embodiments of the present disclosure are merely for description, and do not represent the advantages and disadvantages of the example embodiment.

In the foregoing example embodiments of the present disclosure, the description of each example embodiment has its own emphasis. For a part that is not described in detail in an example embodiment, reference may be made to related descriptions in other example embodiments.

In the several example embodiments provided in the present disclosure, it should be understood that the disclosed technical content may be implemented in other ways. The apparatus example embodiment described above is only schematic. For example, the division of units is only a logical function division. In actual implementation, another division manner may be used. For example, a plurality of units or components may be combined or may be integrated into another system; or some features can be ignored or not implemented. In addition, the displayed or discussed mutual coupling, direct coupling, or communication connection may be indirect coupling or communication connection by means of some interfaces, units, or modules, which may also be electrical or other forms.

The units described as separate components may or may not be physically separated; and the components displayed as units may or may not be physical units; that is, the units may be located in one place, or may be distributed on a plurality of network units. Some or all of the units may be selected according to actual needs to achieve the object of the solution of this example embodiment.

In addition, each functional unit in each example embodiment of the present disclosure can be integrated into a processing unit, or each unit may exist separately physically, or two or more units can be integrated into one unit. The above integrated unit may be in the form of hardware or in the form of a software functional unit.

If the integrated unit is implemented in the form of a software functional unit and sold or used as an independent product, it may be stored in a computer-readable storage medium. Based on such an understanding, the part of the technical solution of the present disclosure, which is essential or contributes to the prior art, can be embodied in the form of a software product. The computer software product is stored in a storage medium, and comprises several instructions for enabling a terminal device (which may be a personal computer, a server, a network device, or the like) to execute all or some steps of the methods according to each example embodiment of the present disclosure. The aforementioned storage media comprises a USB disk, a ROM, a RAM, a removable hard disk, a magnetic disk or an optical disk, and other media that can store program code.

The above are merely example embodiments of the present disclosure. It should be noted that for a person of ordinary skill in the art, improvements and modifications may be made without departing from the principles of the present disclosure. These improvements and modifications should also be deemed as falling within the protection scope of the present disclosure.

The present disclosure may further be understood with clauses as follows.

Clause 1. An FPGA device comprising:
a management logic unit and a user logic unit,
wherein:
the management logic unit comprises a PCIe module; and
the PCIe module comprises a first physical functional unit and a second physical functional unit; and
the first physical functional unit is configured to: receive a user logic loading request initiated by the second physical functional unit, wherein the user logic loading request carries a user logic identifier; obtain a user logic file according to the user logic identifier; and burn the user logic file into the user logic unit via a PCIe configuration channel.

Clause 2. The FPGA device according to clause 1, wherein the management logic unit further comprises a storage medium control module,
wherein:
the first physical functional unit is further configured to receive an upgrade request sent by a server, and obtain an upgrade file from a host via a PCIe interface according to the upgrade request; and
the storage medium control module is connected with the first physical functional unit and is configured to upgrade a storage medium according to the upgrade file.

Clause 3. The FPGA device according to clause 1, further comprising a shared register,
wherein:
the second physical functional unit is further configured to report exception information via the shared register; and
the first physical functional unit is further configured to obtain the exception information from the shared register and perform an operation corresponding to the exception information.

Clause 4. The FPGA device according to clause 1, wherein:
the user logic unit comprises a direct access interface; and
the second physical functional unit is further configured to exchange data with the user logic unit via the direct access interface.

Clause 5. The FPGA device according to clause 1, wherein:

the management logic unit further comprises a virtual JTAG module;

the second physical functional unit is configured to obtain debugging data of the user logic unit; and the virtual JTAG module is connected with the second physical functional unit and is configured to debug the debugging data via the PCIe interface.

Clause 6. The FPGA device according to clause 1, wherein the management logic unit further comprises:

a monitor module, connected with the first physical functional unit and configured to detect a temperature and power consumption of hardware, and transmit the detected temperature and power consumption to the first physical functional unit.

Clause 7. The FPGA device according to clause 1, wherein the management logic unit further comprises:

an error recovery mechanism module, connected with an out-of-band communication interface and configured to reset the user logic unit in case of any abnormality of the user logic unit.

Clause 8. The FPGA device according to clause 1, wherein the first physical functional unit is further configured to verify a bitstream of the user logic file; and in a case of a successful verification, trigger the burning of the user logic file into the user logic unit via the PCIe configuration channel.

Clause 9. The FPGA device according to clause 1, wherein:

the user logic loading request further carries a dynamic verification identifier; and the first physical functional unit is further configured to perform a permission verification according to the dynamic verification identifier and a preset verification identifier received from a server, and in a case of a successful verification, trigger the obtaining of the user logic file based on the user logic identifier.

Clause 10. A cloud system based on an FPGA device, the cloud system comprising:

a host; and at least one FPGA device according to any one of claims 1 to 9.

Clause 11. The system according to clause 10, wherein the host comprises a PCIe driver configured to exchange data with a PCIe module in the FPGA device.

Clause 12. The system according to clause 10, wherein:

the host comprises a management environment and a user environment;

the management environment is used to access a management logic unit in the FPGA device via a first physical functional unit in the FPGA device in response to a user's operation; and the user environment is used to access a user logic unit in the FPGA device via a second physical functional unit in the FPGA device in response to the user's operation.

What is claimed is:

1. An integrated circuit (IC) comprising:

a management logic unit, wherein:

the management logic unit comprises a PCIe module; and the PCIe module comprises a first physical functional unit and a second physical functional unit; and the first physical functional unit is configured to: receive a user logic loading request initiated by the second physical functional unit, wherein the user logic loading request carries a user logic identifier; obtain a user logic file according to the user logic identifier; and burn the user logic file into the user logic unit via a PCIe configuration channel.

2. The IC according to claim 1, wherein the IC is an FPGA device.

3. The IC according to claim 1, further comprising a user logic unit.

4. The IC according to claim 1, wherein the management logic unit further comprises a storage medium control module, wherein:

the first physical functional unit is further configured to receive an upgrade request sent by a server, and obtain an upgrade file from a host via a PCIe interface according to the upgrade request; and the storage medium control module is connected with the first physical functional unit and is configured to upgrade a storage medium according to the upgrade file.

5. The IC according to claim 1, further comprising a shared register, wherein:

the second physical functional unit is further configured to report exception information via the shared register; and the first physical functional unit is further configured to obtain the exception information from the shared register and perform an operation corresponding to the exception information.

6. The IC according to claim 1, wherein:

the user logic unit comprises a direct access interface.

7. The IC according to claim 6, wherein:

the second physical functional unit is further configured to exchange data with the user logic unit via the direct access interface.

8. The IC according to claim 1, wherein:

the management logic unit further comprises a virtual joint test action group (JTAG) module;

the second physical functional unit is configured to obtain debugging data of a user logic unit; and the virtual JTAG module is connected with the second physical functional unit and is configured to debug the debugging data via the PCIe interface.

9. The IC according to claim 1, wherein the management logic unit further comprises:

a monitor module, connected with the first physical functional unit and configured to detect a temperature and power consumption of hardware, and transmit the detected temperature and power consumption to the first physical functional unit.

10. The IC according to claim 1, wherein the management logic unit further comprises:

an error recovery mechanism module connected with an out-of-band communication interface and configured to reset a user logic unit in case of any abnormality of the user logic unit.

11. The IC according to claim 1, wherein the first physical functional unit is further configured to verify a bitstream of the user logic file; and in a case of a successful verification, trigger the burning of the user logic file into a user logic unit via the PCIe configuration channel.

12. The IC according to claim 1, wherein:

the user logic loading request further carries a dynamic verification identifier; and the first physical functional unit is further configured to perform a permission verification according to the dynamic verification identifier and a preset verification identifier received from a server, and in a case of a successful verification, trigger the obtaining of the user logic file based on the user logic identifier.

13. A method performed by a field programable gate array (FPGA), the method comprising:
    receiving, by a first physical function unit of the FPGA, a user logic loading request initiated by a second physical functional unit of the FPGA, the user logic loading request carrying a user logic identifier, wherein the FPGA includes a PCIe module that is divided into the first physical function unit and the second function unit;
    obtaining, by the first physical function unit, a user logic file based on the user logic identifier; and
    burning, by the first physical function unit, the user logic file into a user logic unit via a PCIe configuration channel.

14. The method according to claim 13, wherein the obtaining the user logic file based on the user logic identifier comprises:
    obtaining the user logic file from a remote storage based on the user logic identifier.

15. A cloud system comprising:
    an FPGA device, the FPGA device including:
    a management logic unit and a user logic unit,
    wherein:
    the management logic unit comprises a PCIe module; and
    the PCIe module comprises a first physical functional unit and a second physical functional unit; and
    the first physical functional unit is configured to: receive a user logic loading request initiated by the second physical functional unit, wherein the user logic loading request carries a user logic identifier; obtain a user logic file according to the user logic identifier; and burn the user logic file into the user logic unit via a PCIe configuration channel.

16. The cloud system according to claim 15, further comprising a host.

17. The cloud system according to claim 16, wherein the host comprises a PCIe driver configured to exchange data with a PCIe module in the FPGA device.

18. The cloud system according to claim 15, wherein:
    the host comprises a management environment and a user environment.

19. The cloud system according to claim 18, wherein:
    the management environment is used to access a management logic unit in the FPGA device via the first physical functional unit in the FPGA device; and
    the user environment is used to access a user logic unit in the FPGA device via the second physical functional unit in the FPGA device.

20. The method according to claim 13, further comprising:
    verifying, by the first physical functional unit, a bitstream of the user logic file; and
    in a case of a successful verification, triggering, by the first physical functional unit, the burning of the user logic file into a user logic unit via the PCIe configuration channel.

* * * * *